US010085226B2

(12) United States Patent
Xia et al.

(10) Patent No.: US 10,085,226 B2
(45) Date of Patent: Sep. 25, 2018

(54) METHOD AND APPARATUS FOR SENDING DEVICE-TO-DEVICE SYNCHRONIZATION SIGNAL, AND USER EQUIPMENT

(71) Applicant: ZTE Corporation, Shenzhen (CN)

(72) Inventors: Shuqiang Xia, Shenzhen (CN); Ming Yuan, Shenzhen (CN); Shuanshuan Wu, Shenzhen (CN); Yifei Yuan, Shenzhen (CN); Jing Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 81 days.

(21) Appl. No.: 15/114,040

(22) PCT Filed: Aug. 27, 2014

(86) PCT No.: PCT/CN2014/085342
§ 371 (c)(1),
(2) Date: Jul. 25, 2016

(87) PCT Pub. No.: WO2015/109851
PCT Pub. Date: Jul. 30, 2015

(65) Prior Publication Data
US 2017/0041892 A1 Feb. 9, 2017

(30) Foreign Application Priority Data

Jan. 24, 2014 (CN) .......................... 2014 1 0037524

(51) Int. Cl.
*H04W 56/00* (2009.01)
*H04W 76/14* (2018.01)
(Continued)

(52) U.S. Cl.
CPC ....... *H04W 56/002* (2013.01); *H04J 13/0062* (2013.01); *H04L 5/0048* (2013.01);
(Continued)

(58) Field of Classification Search
None
See application file for complete search history.

(56) References Cited

U.S. PATENT DOCUMENTS 8,295,389 B2 * 10/2012 Han ..................... H04L 5/0007
375/260
9,451,570 B2 * 9/2016 Cheng .................. H04W 8/005
(Continued)

FOREIGN PATENT DOCUMENTS

| CN | 102790972 A | 11/2012 |
| WO | 2013049959 A1 | 4/2013 |

OTHER PUBLICATIONS

International Search Report dated Oct. 29, 2014 re: Application No. PCT/CN2014/085342; pp. 1-2; citing WO 2013049959 A1 and CN 102790972 A.
(Continued)

*Primary Examiner* — Lonnie V Sweet
(74) *Attorney, Agent, or Firm* — Cantor Colburn LLP (57) ABSTRACT

Provided are a method and apparatus for sending a Device-to-Device Synchronization Signal (D2D SS), and a User Equipment (UE). The method includes: selecting, by a source UE one Zadoff-Chu (ZC) sequence from M predetermined ZC sequences of which a length is N; mapping, by the source UE the selected ZC sequence to a predefined D2D SS source; and sending, by the source UE a D2D SS obtained after the mapping to a target UE. The method effectively reduces mutual interferences between a Demodulation-Reference Signal (DM-RS) and a Sounding Reference Signal (SRS) sent by the target UE and the D2D SS. The apparatus includes: a selection component, a mapping component, and a sending component. The apparatus may also include: a storage component, and a processing component.

21 Claims, 3 Drawing Sheets (51) Int. Cl.
  *H04W 72/08* (2009.01)
  *H04J 13/00* (2011.01)
  *H04L 5/00* (2006.01)
  *H04L 27/26* (2006.01)
  *H04W 76/02* (2009.01)

(52) U.S. Cl.
  CPC ....... *H04L 27/2607* (2013.01); *H04W 72/082* (2013.01); *H04W 76/023* (2013.01); *H04W 76/14* (2018.02)

(56) References Cited

U.S. PATENT DOCUMENTS

| | | | | |
|---|---|---|---|---|
| 2014/0169361 | A1* | 6/2014 | Kim | H04W 56/0015 370/350 |
| 2015/0003263 | A1* | 1/2015 | Senarath | H04L 5/0051 370/252 |
| 2016/0044618 | A1* | 2/2016 | Sheng | H04W 56/0005 370/329 |
| 2016/0142991 | A1* | 5/2016 | Classon | H04W 56/001 370/350 |
| 2017/0188320 | A1* | 6/2017 | Xiong | H04W 56/001 |

OTHER PUBLICATIONS

Ericsson "Synchronization Signals and Channel Design for D2D Discovery and Communication", 3GPP TSG RAN GW1 Meeting #75; San Francisco, USA Nov. 11-15, 2013; 3GPP Draft; R1-135903; pp. 1-10.

Huawei et al. "Design considerations for D2DSS" 3GPP TSG RAN GW1 Meeting #75; San Francisco, USA Nov. 11-15, 2013; 3GPP Draft; R1-135532; pp. 1-5.

LG Electronics "Discussion on design of D2DSS and PD2DSCH", 3GPP TSG RAN WG1 Meeting #75; 3GPP Draft; R1-135479 D2DSS and PD2DSCH_LG; San Francisco, USA, Nov. 11-15, 2013; pp. 1-6.

Supplemental European Search Report dated Jan. 3, 2017 re: Application No. 14880313.3 (PCT/CN2014/085342); pp. 1-9; citing: LG Electronics, Ericsson and Huawei et al.

* cited by examiner

METHOD AND APPARATUS FOR SENDING DEVICE-TO-DEVICE SYNCHRONIZATION SIGNAL, AND USER EQUIPMENT

FIELD

The present disclosure relates to the field of communications, and in particular to a method and apparatus for sending a Device-to-Device Synchronization Signal (D2D SS), and a User Equipment (UE).

BACKGROUND

Since a cellular communication system achieves reuse of limited spectrum resources, wireless communication technologies have been dramatically developed. In a cellular system, when there are services needing to be transmitted between two UEs (service data transmission from a UE 1 to a UE 2 for instance), service data is transmitted to a base station (evolved Node B (eNB)) 1 via an air interface, the eNB 1 transmits user data to an eNB 2 via a core network, and the eNB 2 transmits the service data to the UE 2 via an air interface. The service data transmission from the UE 2 to the UE 1 adopts a similar processing flow.

Figure 1:
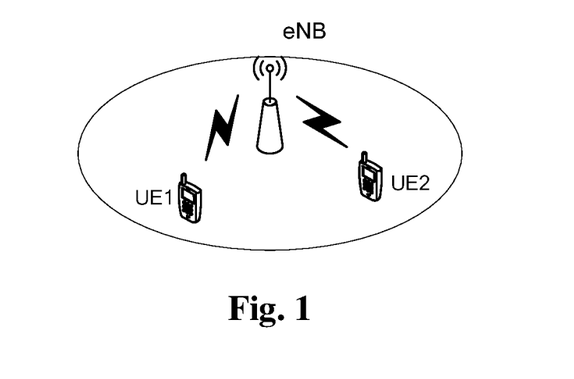
FIG. 1 is a diagram of cellular communication when UEs are located in an identical cell of an eNB according to the relevant art.

FIG. 1 is a diagram of cellular communication when UEs are located in an identical cell of an eNB according to the relevant art. As shown in FIG. 1, when the UE 1 and the UE 2 are located in an identical cell, although the eNB 1 and the eNB 2 are actually an identical site, two sets of radio spectrum resources will be still consumed in single data transmission.

Thus, it can be seen that if the UE 1 and the UE 2 are located in the identical cell and in proximity to each other, the above cellular communication method is not an optimal communication mode obviously. Actually, as mobile communication services are diversified, for example, as a social network, an electronic payment application and the like are more and more widely applied to a wireless communication system, the demand for service transmission between close users is increasing. Consequently, a D2D communication mode has been more and more widely concerned. D2D refers to direct transmission of the service data from a source UE to a target UE via an air interface without forwarding via the eNBs, and the communication mode is distinguished from a communication mode of a traditional cellular system. For users in near field communication, D2D saves the radio spectrum resources and reduces the data transmission burden of the core network. The D2D communication based on a cellular network is a novel technology for direct communications between multiple terminal devices supporting a D2D function under the control of a system, which can reduce the resource occupation of the system, increase the spectrum efficiency of the cellular communication system, reduce the transmitting power consumption of a terminal and reduce the network operation cost to a great extent.

In the D2D communication, the precondition of data transmission between the source UE and the target UE is the time frequency synchronization between a transmitter and a receiver firstly. That is, the source UE sends a D2D SS, and the target UE implements time frequency synchronization between the transmitter and the receiver according to the received D2D SS. A 3rd Generation Partnership Project (3GPP) has decided, on a ran1#74bis conference, that: the D2D SS contains a Zadoff-Chu (ZC) sequence, and the specific selection of the ZC sequence is to be determined by subsequent research. In a Long Term Evolution (LTE) system, a Sounding Reference Signal (SRS) for channel sounding and a Demodulation-Reference Signal (DM-RS) demodulated by a Physical Uplink Share Channel (PUSCH) are ZC sequences (or sequences obtained by performing cyclic shift expansion on the ZC sequences, sequences obtained by punching partial elements of the ZC sequences and the like). Without loss of generality, the source UE sends a D2D SS (ZC sequence) of which a length is N at a frequency domain position 1, and in this situation, there exist problems as follows needing to be solved.

1. An interference UE sends an SRS or a DM-RS of which the length is M at a frequency domain position 2 which is completely not overlapped with the frequency domain position 1 (time domain positions may be identical or different). Even if M is not equal to N, the SRS or DM-RS signal may be greatly correlated to the D2D SS. At this time, the target UE may take the DM-RS or the SRS of the UE 2 as the D2D SS by mistake so as to cause synchronization failure.

2. An interference UE (for example, a neighbour UE of the source UE) sends an SRS or a DM-RS of which the length is M at the frequency domain position 2 which is completely or partially overlapped with the frequency domain position 1 (the time domain positions may be identical or different). At this time, when the target UE performs time frequency synchronization between the transmitter and the receiver according to the received D2D SS, the SRS or the DM-RS sent by the interference UE may bring a great interference to the synchronization between the target UE and the source UE, the interference including that: (1) the accuracy of time frequency synchronization is reduced; and (2) the target UE may perform channel estimation by utilizing the received D2D SS, and the SRS or the DM-RS sent by the interference UE may bring a great negative influence on the accuracy of channel estimation.

Thus, it can be seen that in the method for sending a D2D SS in the relevant art, the DM-RS or the SRS sent by the interference UE easily brings interference to the D2D SS.

An effective solution is not currently available for the problem in the relevant art that the DM-RS or the SRS sent by the interference UE easily brings interference to the D2D SS.

SUMMARY

The embodiments of the present disclosure provide a method and apparatus for sending a D2D SS, and a UE, which are intended to at least solve the problem.

According to an embodiment of the present disclosure, a method for sending a D2D SS is provided, which may include that: selecting, by a source UE one ZC sequence from M predetermined ZC sequences of which a length is N, mapping, by the source UE the selected ZC sequence to a predefined D2D SS resource, and sending, by the source UE, a D2D SS obtained after the mapping to a target UE.

According to another embodiment of the present disclosure, an apparatus for sending a D2D SS is provided, which may be located at a UE and may include: a selection component, configured to select one ZC sequence from M predetermined ZC sequences of which a length is N; a mapping component, configured to map the selected ZC sequence to a predefined D2D SS resource; and a sending component, configured to send a D2D SS obtained after the mapping to a target UE.

According to another embodiment of the present disclosure, a UE is provided, which may include the apparatus for sending a D2D SS.

By means of the embodiments of the present disclosure, the source UE selects one ZC sequence from the M ZC sequences of which the length is N, and maps the selected ZC sequence to the predefined D2D SS resource, so that the sequence serving as the D2D SS or a part of the D2D SS is sent out, and the problem in the relevant art that a DM-RS or an SRS sent by an interference UE easily brings interference to the D2D SS is solved, thereby achieving the effect of effectively reducing the interference to the D2D SS caused by a Primary Synchronization Signal (PSS), a DM-RS and an SRS sent by a traditional LTE system.

BRIEF DESCRIPTION OF THE DRAWINGS

The drawings described here are intended to provide further understanding of the present disclosure, and form a part of the present disclosure. The schematic embodiments and descriptions of the present disclosure are intended to explain the present disclosure, and do not form improper limits to the present disclosure. In the drawings.

DETAILED DESCRIPTION

The present disclosure is described below with reference to the drawings and the embodiments in detail. It is important to note that the embodiments of the present disclosure and the characteristics in the embodiments can be combined mutually under the condition of no conflicts.

Figure 2:
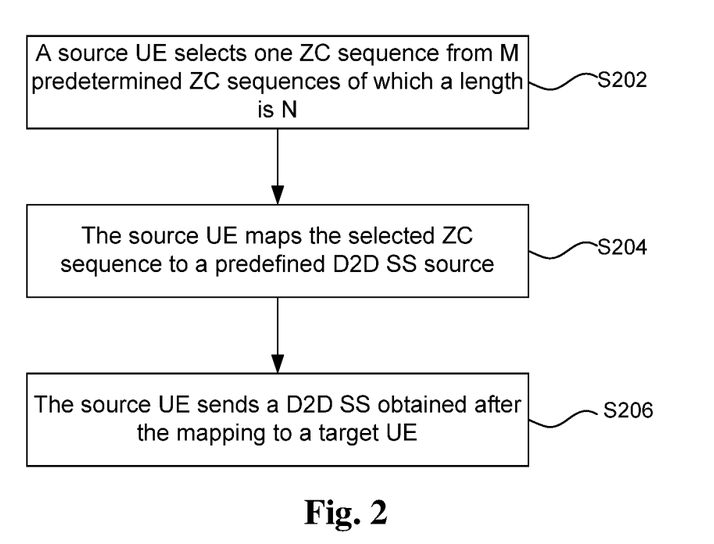
FIG. 2 is a flowchart of a method for sending a D2D SS according to certain embodiments of the present disclosure.

An embodiment of the present disclosure provides a method for sending a D2D SS. FIG. 2 is a flowchart of a method for sending a D2D SS according to an embodiment of the present disclosure. As shown in FIG. 2, the method mainly includes the steps (Step S202 to Step S206) as follows.

Step S202: A source UE selects one ZC sequence from M predetermined ZC sequences of which a length is N.

Step S204: The source UE maps the selected ZC sequence to a predefined D2D SS resource.

Step S206: The source UE sends a D2D SS obtained after the mapping to a target UE.

By means of all the steps, the source UE can select one certain ZC sequence from the M ZC sequences of which the length is N, and then maps the sequence to the predefined D2D SS resource, so that the sequence serving as the D2D SS or a part of the D2D SS is sent out, and without loss of generality, mutual interferences between a DM-RS and an SRS sent by the target UE and the D2D SS can be reduced.

When the source UE and the target UE are located in a no network coverage scenario, the mutual interferences between the DM-RS and the SRS sent by the target UE and the D2D SS can be effectively reduced.

In certain embodiments, $N \in L$, $M \in [1,Q]$, and a maximum value Q of M is correlated to the length N of the selected ZC sequence, where $L = \{37\ 41\ 43\ 47\ 53\ 59\ 61\ 62\ 63\ 64\ 67\ 71\ 73\}$;

when N=37, Q=6; when N=41, Q=10; when N=43, Q=12; when N=47, Q=16; when N=53, Q=22; when N=59, Q=28; when N=61, Q=30; when N=62, Q=4; when N=63, Q=7; when N=64, Q=2; when N=67, Q=36; when N=71, Q=40; when N=73, Q=42.

In an exemplary embodiment, Step S202 may be implemented in such a way that: the source UE determines a sequence set of a ZC sequence needing to be selected by means of the following formula, and randomly selects one sequence from the sequence set as the ZC sequence needing to be selected.

$$d_u(n) = e^{-j\frac{\pi un(n+1)}{N}}, \quad n = 0, 1 \ldots N-1, \text{ or}$$

$$d_u(n) = e^{j\frac{\pi un(n+1)}{N}}, \quad n = 0, 1 \ldots N-1,$$

where a set of root indexes u corresponding to the ZC sequence set is S, and when N is assigned with different values, the set S is:

$S = \{3\ 9\ 15\ 22\ 28\ 34\}$, when $N = 37$;

$S = \{2\ 6\ 10\ 14\ 18\ 23\ 27\ 31\ 35\ 39\}$, when $N = 41$;

$S = \{2\ 5\ 9\ 13\ 16\ 20\ 23\ 27\ 30\ 34\ 38\ 41\}$, when $N = 43$;

$S = \{1\ 4\ 7\ 10\ 13\ 16\ 19\ 22\ 25\ 28\ 31\ 34\ 37\ 40\ 43\ 46\}$, when $N = 47$;

$S = \begin{Bmatrix} 1 & 4 & 6 & 8 & 11 & 13 & 16 & 18 & 20 & 23 & 25 & 28 & 30 \\ & 33 & 35 & 37 & 40 & 42 & 45 & 47 & 49 & 52 & & & \end{Bmatrix}$, when $N = 53$;

$S = \begin{Bmatrix} 1 & 3 & 5 & 7 & 9 & 12 & 14 & 16 & 18 & 20 & 22 & 24 & 26 & 28 & 31 \\ & 33 & 35 & 37 & 39 & 41 & 43 & 45 & 47 & 50 & 52 & 54 & 56 & 58 & \end{Bmatrix}$, when $N = 59$;

$S = \begin{Bmatrix} 1 & 3 & 5 & 7 & 9 & 11 & 13 & 15 & 17 & 19 & 21 & 23 & 25 & 27 & 29 & 32 \\ & 34 & 36 & 38 & 40 & 42 & 44 & 46 & 48 & 50 & 52 & 54 & 56 & 58 & 60 & \end{Bmatrix}$, when $N = 61$;

$S = \begin{Bmatrix} 1 & 14 & 27 & 40 & 53 & 66 & 3 & 5 & 7 & 8 & 10 & 12 & 16 & 18 \\ 20 & 21 & 23 & 25 & 29 & 31 & 33 & 34 & 36 & 38 & 42 & 44 & 46 & 47 \\ & & 49 & 51 & 55 & 57 & 59 & 60 & 62 & 64 & & & & \end{Bmatrix}$, when $N = 67$;

$S = \begin{Bmatrix} 1 & 8 & 15 & 24 & 31 & 40 & 47 & 56 & 63 & 70 & 3 & 4 & 6 & 10 & 12 \\ & & 13 & 17 & 19 & 20 & 22 & & & & & & & & \\ & 26 & 28 & 29 & 33 & 35 & 36 & 38 & 42 & 43 & 45 & 49 & 51 & 52 & \\ & & 54 & 58 & 59 & 61 & 65 & 67 & 68 & & & & & & \end{Bmatrix}$, when $N = 71$;

$$S = \begin{Bmatrix} 1 & 6 & 13 & 20 & 27 & 34 & 39 & 46 & 53 & 60 & 67 & 72 \\ 3 & 4 & 8 & 10 & 11 & 15 & 17 & 18 & 22 & 23 & 25 & 29 & 30 & 32 & 36 & 37 \\ & 41 & 43 & 44 & 48 & 50 & 51 & 55 & 56 & 58 & 62 & 63 & 65 & 69 & 70 \end{Bmatrix},$$

when $N = 73$;

$S = \{1 \quad 11 \quad 17 \quad 40 \quad 46 \quad 52 \quad 62\}$, when $N = 63$;

$S = \{17 \quad 21 \quad 25 \quad 61\}$, when $N = 62$; and $S = \{1 \quad 63 \quad \}$, when $N = 64$.

In certain embodiments, Step S202 may be implemented in such a way that: the source UE determines a ZC sequence needing to be selected by means of the following formula:

$$d_u(n) = e^{-j\frac{\pi u n(n+1)}{N}}, \quad n = 0, 1 \ldots N-1, \text{ or}$$

$$d_u(n) = e^{j\frac{\pi u n(n+1)}{N}}, \quad n = 0, 1 \ldots N-1,$$

where u is a root index corresponding to a ZC sequence set;

wherein, a manner of determining the root index u includes that: the source UE determines a group index v of a ZC sequence needing to be selected according to a cell identification number K of a cell to which the source UE belongs by means of the following formula, and determines the root index u according to the following table: v=k mod M or $$v = (k \bmod M + \text{offset}) \bmod M,$$

where offset is a parameter configured by high-layer in advance, $0 \leq \text{Offset} < M$;

where, $0 \leq k < 512$, when N is assigned with different values, the root index u of the ZC sequence corresponding to the group index v of the ZC sequence is shown in the following table 1:

| v | N=37 | N=41 | N=43 | N=47 | N=53 | N=59 | N=61 | N=67 | N=71 | N=73 | N=63 | N=62 | N=64 |
|---|---|---|---|---|---|---|---|---|---|---|---|---|---|
| 0 | 3 | 2 | 2 | 1 | 1 | 1 | 1 | 1 | 1 | 1 | 1 | 17 | 1 |
| 1 | 9 | 6 | 5 | 4 | 4 | 3 | 3 | 14 | 8 | 6 | 11 | 21 | 63 |
| 2 | 15 | 10 | 9 | 7 | 6 | 5 | 5 | 27 | 15 | 13 | 17 | 25 | |
| 3 | 22 | 14 | 13 | 10 | 8 | 7 | 7 | 40 | 24 | 20 | 40 | 61 | |
| 4 | 28 | 18 | 16 | 13 | 11 | 9 | 9 | 53 | 31 | 27 | 46 | | |
| 5 | 34 | 23 | 20 | 16 | 13 | 12 | 11 | 66 | 40 | 34 | 52 | | |
| 6 | | 27 | 23 | 19 | 16 | 14 | 13 | 3 | 47 | 39 | 62 | | |
| 7 | | 31 | 27 | 22 | 18 | 16 | 15 | 5 | 56 | 46 | | | |
| 8 | | 35 | 30 | 25 | 20 | 18 | 17 | 7 | 63 | 53 | | | |
| 9 | | 39 | 34 | 28 | 23 | 20 | 19 | 8 | 70 | 60 | | | |
| 10 | | | 38 | 31 | 25 | 22 | 21 | 10 | 3 | 67 | | | |
| 11 | | | 41 | 34 | 28 | 24 | 23 | 12 | 4 | 72 | | | |
| 12 | | | | 37 | 30 | 26 | 25 | 16 | 6 | 3 | | | |
| 13 | | | | 40 | 33 | 28 | 27 | 18 | 10 | 4 | | | |
| 14 | | | | 43 | 35 | 31 | 29 | 20 | 12 | 8 | | | |
| 15 | | | | 46 | 37 | 33 | 32 | 21 | 13 | 10 | | | |
| 16 | | | | | 40 | 35 | 34 | 23 | 17 | 11 | | | |
| 17 | | | | | 42 | 37 | 36 | 25 | 19 | 15 | | | |
| 18 | | | | | 45 | 39 | 38 | 29 | 20 | 17 | | | |
| 19 | | | | | 47 | 41 | 40 | 31 | 22 | 18 | | | |
| 20 | | | | | 49 | 43 | 42 | 33 | 26 | 22 | | | |
| 21 | | | | | 52 | 45 | 44 | 34 | 28 | 23 | | | |
| 22 | | | | | | 47 | 46 | 36 | 29 | 25 | | | |
| 23 | | | | | | 50 | 48 | 38 | 33 | 29 | | | |
| 24 | | | | | | 52 | 50 | 42 | 35 | 30 | | | |
| 25 | | | | | | 54 | 52 | 44 | 36 | 32 | | | |
| 26 | | | | | | 56 | 54 | 46 | 38 | 36 | | | |
| 27 | | | | | | 58 | 56 | 47 | 42 | 37 | | | |
| 28 | | | | | | | 58 | 49 | 43 | 41 | | | |
| 29 | | | | | | | 60 | 51 | 45 | 43 | | | |
| 30 | | | | | | | | 55 | 49 | 44 | | | |
| 31 | | | | | | | | 57 | 51 | 48 | | | |
| 32 | | | | | | | | 59 | 52 | 50 | | | |
| 33 | | | | | | | | 60 | 54 | 51 | | | |
| 34 | | | | | | | | 62 | 58 | 55 | | | |
| 35 | | | | | | | | 64 | 59 | 56 | | | |
| 36 | | | | | | | | | 61 | 58 | | | |
| 37 | | | | | | | | | 65 | 62 | | | |
| 38 | | | | | | | | | 67 | 63 | | | |
| 39 | | | | | | | | | 68 | 65 | | | |
| 40 | | | | | | | | | | 69 | | | |
| 41 | | | | | | | | | | 70 | | | |

In certain embodiments, Step S202 may be implemented in such a way that: a root index m is determined from a root index set S or a subset of the root index set S in a predetermined manner, and a sequence which corresponds to the root index m and is determined from a sequence set is taken as a ZC sequence needing to be selected. In such an implementation mode, the root index can be determined in manners as follows.

(1) When N≠63, the value of the root index m is determined, in the following predetermined manner, as:

u corresponding to a maximum value, a maximum sum of any two values or a maximum sum of three values in $$\left|\frac{25}{63}-\frac{u}{N}\right|, \left|\frac{29}{63}-\frac{u}{N}\right|, \left|\frac{34}{63}-\frac{u}{N}\right|,$$

where u∈S, or u∈subset of S, and S is correlated to the value of N, including:

when $N = 37, S = \{3\ 9\ 15\ 22\ 28\ 34\}$;

when $N = 41, S = \{2\ 6\ 10\ 14\ 18\ 23\ 27\ 31\ 35\ 39\}$;

when $N = 43, S = \{2\ 5\ 9\ 13\ 16\ 20\ 23\ 27\ 30\ 34\ 38\ 41\}$;

when $N = 47$, $S = \{1\ 4\ 7\ 10\ 13\ 16\ 19\ 22\ 25\ 28\ 31\ 34\ 37\ 40\ 43\ 46\}$;

when $N = 53$, $$S = \left\{\begin{matrix} 1 & 4 & 6 & 8 & 11 & 13 & 16 & 18 & 20 & 23 & 25 & 28 & 30 \\ & 33 & 35 & 37 & 40 & 42 & 45 & 47 & 49 & 52 & & & \end{matrix}\right\};$$

when $N = 59$, $$S = \left\{\begin{matrix} 1 & 3 & 5 & 7 & 9 & 12 & 14 & 16 & 18 & 20 & 22 & 24 & 26 & 28 & 31 \\ & 33 & 35 & 37 & 39 & 41 & 43 & 45 & 47 & 50 & 52 & 54 & 56 & 58 & \end{matrix}\right\};$$

when $N = 61$, $S =$ $$\left\{\begin{matrix} 1 & 3 & 5 & 7 & 9 & 11 & 13 & 15 & 17 & 19 & 21 & 23 & 25 & 27 & 29 & 32 \\ & 34 & 36 & 38 & 40 & 42 & 44 & 46 & 48 & 50 & 52 & 54 & 56 & 58 & 60 & \end{matrix}\right\};$$

when $N = 67$;

$$S = \left\{\begin{matrix} 1 & 14 & 27 & 40 & 53 & 66 & 3 & 5 & 7 & 8 & 10 & 12 & 16 & 18 \\ 20 & 21 & 23 & 25 & 29 & 31 & 33 & 34 & 36 & 38 & 42 & 44 & 46 & 47 \\ & & 49 & 51 & 55 & 57 & 59 & 60 & 62 & 64 & & & & \end{matrix}\right\};$$

when $N = 71$, $$S = \left\{\begin{matrix} 1 & 8 & 15 & 24 & 31 & 40 & 47 & 56 & 63 & 70 & 3 & 4 & 6 & 10 & 12 \\ & & 13 & 17 & 19 & 20 & 22 & & & & & & & & \\ 26 & 28 & 29 & 33 & 35 & 36 & 38 & 42 & 43 & 45 & 49 & 51 & 52 & & \\ & & 54 & 58 & 59 & 61 & 65 & 67 & 68 & & & & & & \end{matrix}\right\};$$

when $N = 73$, $S =$ $$\left\{\begin{matrix} & 1 & 6 & 13 & 20 & 27 & 34 & 39 & 46 & 53 & 60 & 67 & 72 & \\ 3 & 4 & 8 & 10 & 11 & 15 & 17 & 18 & 22 & 23 & 25 & 29 & 30 & 32 & 36 & 37 \\ & 41 & 43 & 44 & 48 & 50 & 51 & 55 & 56 & 58 & 62 & 63 & 65 & 69 & 70 & \end{matrix}\right\};$$

when $N = 63, S = \{1\ 11\ 17\ 40\ 46\ 52\ 62\}$;

when $N = 62, S = \{17\ 21\ 25\ 61\}$;

when $N = 64, S = \{1\ 63\ \}$.

(2) The value of the root index m is determined, in the following predetermined manner, as:

$$m = \begin{cases} N-1, & \text{when } N > 43 \text{ and } N \in L \\ N-2, & \text{when } N = 43 \text{ or } 41 \\ N-3, & \text{when } N = 37 \end{cases}.$$

(3) The value of the root index m is determined, in the following predetermined manner, as:

$$m = \begin{cases} 1, & \text{when } N > 43 \text{ and } N \in L \\ 2, & \text{when } N = 43 \text{ or } 41 \\ 3, & \text{when } N = 37 \end{cases}.$$

(4) The value of the root index m is determined, in the following predetermined manner, as at least one of:

u corresponding to a maximum value of $$\sum_{v=1}^{30}\left|\frac{v}{31}-\frac{u}{N}\right|,$$

where u∈S, or u∈subset of S; and u corresponding to a minimum value of $$\left|u-\frac{N}{2}\right|,$$

where u∈S, or u∈subset of S.

In the manner of determining the root index, when N≤67, the value of the root index m is determined, in the following predetermined manner, as:

u corresponding to a minimum value of $$\left|u-\frac{N}{2}\right|,$$

where u∈first K elements of S, and the value of K is:

$$K = \begin{cases} 6, & N = 61 \\ 10, & N = 71 \\ 12, & N = 73 \end{cases}.$$

In certain embodiments, Step S202 may be implemented in such a way that: different root indexes are adopted on different predetermined D2D SS resources according to a predetermined rule, and a ZC sequence needing to be selected is determined according to the root indexes. In such an implementation mode, a root index can be determined according to the following manners:

(1) on a first predefined D2D SS resource, the value of the root index m is:

u corresponding to a minimum value of $$\left|u-\frac{N}{2}\right|;$$

on a second predefined D2D SS resource, the value of the root index m is:

u corresponding to a second minimum value of $$\left|u - \frac{N}{2}\right|,$$

where u∈S, or u∈subset of S; and (2) on the first predefined D2D SS resource, the value of the root index m is:

u corresponding to a maximum value of $$\sum_{v=1}^{30}\left|\frac{v}{31} - \frac{u}{N}\right|;$$

on the second predefined D2D SS resource, the value of the root index m is:

u corresponding to a second maximum value of $$\sum_{v=1}^{30}\left|\frac{v}{31} - \frac{u}{N}\right|,$$

where u∈S, or u∈subset of S.

In certain embodiments, Step S202 may be implemented in such a way that: different group indexes are adopted on different predetermined D2D SS resources according to a predetermined rule, and a ZC sequence needing to be selected is determined according to the root indexes.

In such an implementation mode, a group index can be determined according to the following manners: on the first predefined D2D SS resource, the value of the group index v is: v=(k mod M+offset_1) Mod M; on the second predefined D2D SS resource, the value of the group index v is: v=(k mod M+offset_2) Mod M, where offset_1 and offset_2 are parameters configured by high-layer in advance, 0≤Offset_1, Offset_2<M, and Offset_1≠Offset_2.

In certain embodiments, Step S202 may be implemented in such a way that: the source UE adopts a root index indicated by network side signalling, and determines a ZC sequence needing to be selected according to the root index.

In certain embodiments, Step S202 may be implemented in such a way that: the source UE adopts a group index indicated by network side signalling, and determines a ZC sequence needing to be selected according to the group index.

In certain embodiments, when there are multiple source UEs, the multiple source UEs adopt identical ZC sequence group indexes or corresponding ZC sequence root indexes to determine a ZC sequence needing to be selected.

In certain embodiments, before the source UE maps the selected ZC sequence to the predefined D2D SS resource, the method further includes that: the source UE performs cyclic shift expansion or punching on the selected ZC sequence.

By means of the method for sending a D2D SS provided by the embodiment, the source UE selects a certain ZC sequence from the M ZC sequences of which the length is N according to the predefined D2D SS resource, maps the sequence to the predefined D2D SS resource (according to the conditions of the predefined D2D SS resource, the source UE can perform cyclic shift expansion or punching on the ZC sequence in prior to mapping), and finally sends them out by taking them as the D2D SS or a part of the D2D SS, thereby avoiding the loss of generality.

The method for sending a D2D SS provided by the embodiment is described and explained in more detail with reference to FIG. 3 to FIG. 5 and an exemplary embodiment 1 to an exemplary embodiment 3.

Exemplary Embodiment 1

Figure 3:
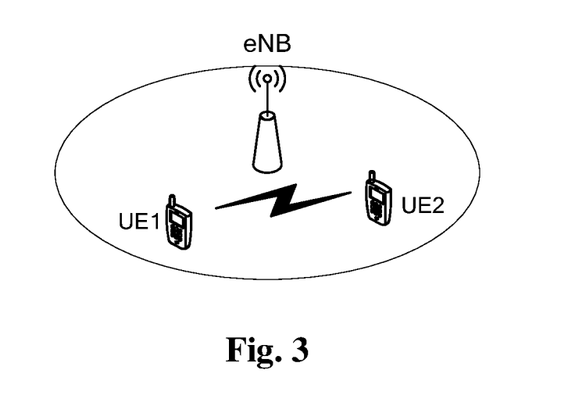
FIG. 3 is a structural diagram of a D2D communication system according to an exemplary embodiment 1 of the present disclosure.

FIG. 3 is a structural diagram of a D2D communication system according to an exemplary embodiment 1 of the present disclosure. As shown in FIG. 3, a source UE (UE 1) and a target UE (UE 2) perform D2D communication. Suppose a predefined D2D SS resource contains 36 resource elements, each resource element can send an element of the sequence, the UE 1 selects a ZC sequence of which the length is 37 according to the conditions of the predefined D2D SS resource, it can be seen, from Table 1, that at most 6 groups of ZC sequences can be selected by the UE 1, and the UE 1 selects ZC sequences of which group indexes are 0, 1, 2, 4 and 5 from these 6 groups, M being equal to 5 in this exemplary embodiment.

In view of that the UE 1 and the UE 2 are located within an eNB coverage range, before the D2D communication, the UE 1 and the UE 2 have established a link relationship with an eNB, the UE 1 has known a cell identification number of a cell to which the UE1 belongs, and if the cell identification number is 60, a group sequence i of a ZC sequence selected to be sent by the UE 1 can be obtained by means of the following formula: i=60 mod 5=0.

The UE 1 selects to send a $0^{th}$ D2D SS, and a ZC sequence corresponding to the 0th D2D SS is:

$$d_0(n) = e^{-j\frac{\pi n(n+1)}{37}}, n = 0, 1 \ldots 36.$$

Suppose the eNB can send an offset parameter to the UE 1, the UE 1 can determine a group index according to i=(60 mod 5+offset) mod 5, that is, the eNB can affect the ZC sequence selection of the UE 1 by means of offset.

Suppose it can be determined, by means of the cell identification number 60, that a ZC sequence index for a PSS sent by the eNB is 25, in 5 groups of selectable ZC sequences, u corresponding to a maximum value of $$\left|\frac{25}{63} - \frac{u}{N}\right|$$

that can be ensured is equal to 34. Thus, the UE 1 selects to send the $5^{th}$ group of ZC sequence in Table 1, and the ZC sequence corresponding to a $5^{th}$ D2D SS is:

$$d_{34}(n) = e^{-j\frac{\pi 34 n(n+1)}{37}}, n = 0, 1 \ldots 36.$$

Certainly, different D2D SS s can be selected to be sent at different moments according to a predefined rule.

Furthermore, when the number of the predefined D2D SS resources changes, the source UE can select ZC sequences with different lengths to be sent according to the conditions of the predefined D2D SS resources.

In terms of effect, the selection of the ZC sequence corresponding to the 0th D2D SS can effectively reduce the interference to the D2D SS caused by a DM-RS or an SRS sent by other intra-cell or inter-cell interference devices, and can, certainly, reduce the interference to the DM-RS or the SRS sent by other devices caused by the D2D SS. The selection of the 5th D2D SS can fulfil the aim, and can additionally reduce mutual interferences between a PSS sent by this cell and the D2D SS. When the UE 1 belongs to a time division duplex system cell, the selected 5th D2D SS is superior to the selected 0th D2D SS in performance due to uplink/downlink same-frequency of the time division duplex system cell.

In view of that the predefined D2D SS resource contains 36 resource elements and each resource element can send an element of the sequence, the sequence finally sent by the UE 1 is a sequence obtained by punching the sequence. For example, only elements from 0 to 17 and 19 to 36 are sent.

In view of that the UE 1 and the UE 2 have established the link relationship with the eNB, the D2D SS sent by the UE 1 can be received according to an instruction of the eNB.

Exemplary Embodiment 2

Figure 4:
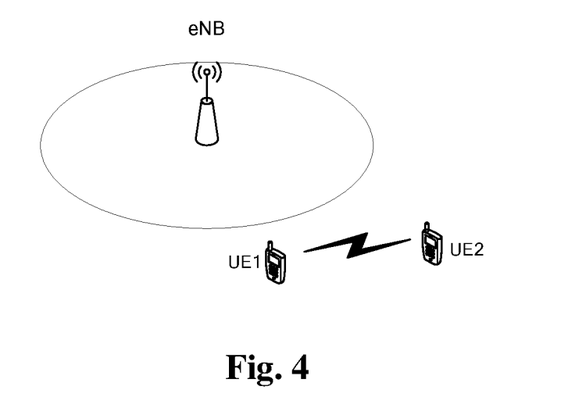
FIG. 4 is a structural diagram of a D2D communication system according to an exemplary embodiment 2 of the present disclosure.

FIG. 4 is a structural diagram of a D2D communication system according to an exemplary embodiment 2 of the present disclosure. As shown in FIG. 4, a source UE (UE 1) and a target UE (UE 2) perform D2D communication. Suppose a predefined D2D SS resource contains 62 resource elements, each resource element can send an element of the sequence, the UE 1 selects a ZC sequence of which the length is 59 according to the conditions of the predefined D2D SS resource, and it can be seen, from Table 1, that at most 28 groups of ZC sequences can be selected by the UE 1. In view of that the UE 1 and the UE 2 cannot establish a link relationship with an eNB, the UE 1 and the UE 2 can appoint that a certain predetermined ZC sequence root index can be selected all the time. For example, a root index satisfying maximum values of the following three absolute values is adopted all the time, where u∈S, $$\left|\frac{25}{63} - \frac{u}{N}\right| + \left|\frac{29}{63} - \frac{u}{N}\right| + \left|\frac{34}{63} - \frac{u}{N}\right|,$$

$$S = \left\{\begin{matrix} 1 & 3 & 5 & 7 & 9 & 12 & 14 & 16 & 18 & 20 & 22 & 24 & 26 & 28 & 31 \\ 33 & 35 & 37 & 39 & 41 & 43 & 45 & 47 & 50 & 52 & 54 & 56 & 58 & & \end{matrix}\right\},$$

it can be obtained, according to calculation, that u is equal to 58 in such a condition, a ZC sequence selected by the UE 1 is:

$$d(n) = e^{-j\frac{\pi 58 n(n+1)}{59}}, n = 0, 1 \ldots 58.$$

Suppose the predefined D2D SS resource contains 62 resource elements and each resource element can sent an element of the sequence, the sequence finally sent by the UE 1 is a sequence obtained by cyclically expanding the sequence. For example, the finally-sent D2D SS sequence is:

$$s_u(n) = d(n \bmod 59), n = 0, 1 \ldots 61$$

It is important to note that in the manner of determining the D2D SS sequence, the D2D SS sequence can be dynamically calculated at each D2D SS sending moment, or can be predetermined and stored in an offline mode. Thus, at each D2D SS sending moment, a pre-stored result can be utilized.

It is also important to note that in the exemplary embodiment, there are only two UEs 1 and UEs 2. When there are multiple UEs 1 and UEs 2, these UEs 1 and UEs 2 can appoint that a certain designated group index can be selected all the time, and furthermore, these appointed group indexes can be identical.

Exemplary Embodiment 3

Figure 5:
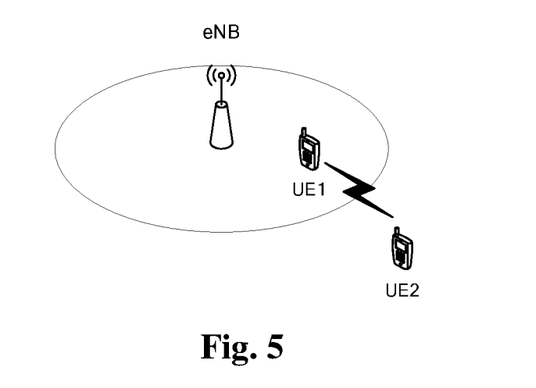
FIG. 5 is a structural diagram of a D2D communication system according to an exemplary embodiment 3 of the present disclosure.

FIG. 5 is a structural diagram of a D2D communication system according to an exemplary embodiment 3 of the present disclosure. As shown in FIG. 3, a source UE (UE 1) and a target UE (UE 2) perform D2D communication. In the example, the UE 1 is located within an eNB coverage range, and the UE 2 is out of the eNB coverage range. At this time, an eNB can affect the ZC sequence selection of the UE 1 by means of signalling, but it is difficult to affect the D2D SS receiving and detection of the UE 2.

In another aspect, the UE 1 and the UE 2 can appoint that a certain designated group index can be selected all the time. Suppose a predefined D2D SS resource contains 73 resource elements, ten of the resource elements are used for reservation (for example, the ten resource elements are used for reducing a peak-to-average ratio of the sent D2D SS), and each of the other resource elements can send an element of the sequence. The UE 1 selects a ZC sequence of which the length is 63 according to the conditions of the predefined D2D SS resource, and the UE 1 and the UE 2 can appoint that a ZC sequence of which the root index is 17 can be selected all the time, the sequence being:

$$d_u(n) = e^{j\frac{\pi 17 n(n+1)}{63}}, n = 0, 1 \ldots 62$$

In view of complete matching between remaining resource elements and the length of the ZC sequence, the UE 1 can map the ZC sequence to the remaining resource elements, and the sequence serving as a part of a final D2D SS is sent out.

By implementing the three exemplary embodiments, mutual interferences between a DM-RS and an SRS sent by the target UE and the D2D SS can be reduced. When the source UE and the target UE are located in a no network coverage scenario, the mutual interferences between the DM-RS and the SRS sent by the target UE and the D2D SS can be effectively reduced.

Figure 6:
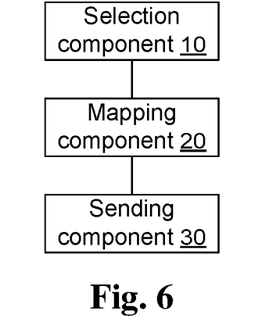
FIG. 6 is a structure block diagram of an apparatus for sending a D2D SS according to an embodiment of the present disclosure.

An embodiment of the present disclosure also provides an apparatus for sending a D2D SS, which is located at a UE and is configured to implement the method for sending a D2D SS provided by the above embodiment. FIG. 6 is a structure block diagram of an apparatus for sending a D2D SS according to an embodiment of the present disclosure. As shown in FIG. 6, the apparatus mainly includes: a selection component 10, a mapping component 20 and a sending component 30, wherein the selection component 10 is configured to select one ZC sequence from M predetermined ZC sequences of which a length is N; the mapping component 20 is configured to map the selected ZC sequence to a predefined D2D SS resource; and the sending component 30 is configured to send a D2D SS obtained after the mapping to a target UE.

Figure 7:
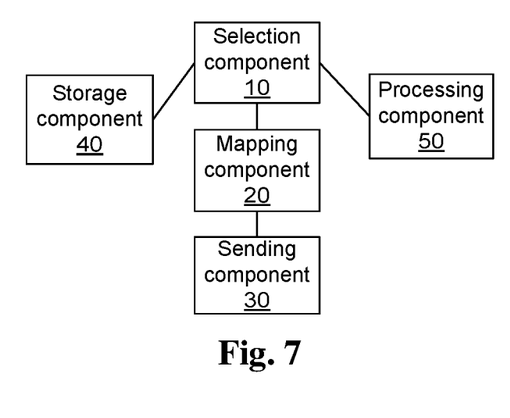
FIG. 7 is a structure block diagram of an exemplary apparatus for sending a D2D SS according to an embodiment of the present disclosure.

FIG. 7 is a structure block diagram of an exemplary apparatus for sending a D2D SS according to an embodiment of the present disclosure. As shown in FIG. 7, the exemplary apparatus for sending a D2D SS further includes:

a storage component 40, configured to store the selected ZC sequence; and a processing component 50, configured to perform cyclic shift expansion or punching on the selected ZC sequence.

Figure 8:
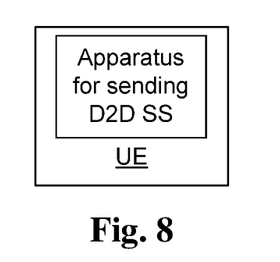
FIG. 8 is a structural diagram of a UE according to an embodiment of the present disclosure.

An embodiment of the present disclosure also provides a UE. FIG. 8 is a structural diagram of a UE according to an embodiment of the present disclosure. As shown in FIG. 8, the UE includes the apparatus for sending a D2D SS shown in FIG. 6 or FIG. 7.

By means of the apparatus for sending a D2D SS or the UE provided by the embodiments, mutual interferences between a DM-RS and an SRS sent by the target UE and the D2D SS can be reduced. When the source UE and the target UE are located in a no network coverage scenario, the mutual interferences between the DM-RS and the SRS sent by the target UE and the D2D SS can be effectively reduced.

It is important to note that all components may be implemented by hardware. For example, a processor includes all the components, or each component is located in a processor.

In another embodiment, software is also provided, which is configured to execute the technical solutions described in the embodiments and an exemplary implementation mode.

In another embodiment, a storage medium is also provided. The software is stored in the storage medium. The storage medium includes (but not limited to): an optical disc, a floppy disk, a hard disk, an erasable memory and the like.

From the above descriptions, it can be seen that the present disclosure achieves the technical effects as follows. When the source UE and the target UE are located in a network coverage scenario or a network half-coverage scenario, the technical solutions of the present disclosure can effectively reduce the interference to the D2D SS caused by a PSS, a DM-RS and an SRS sent by a traditional LTE system, and can reduce the mutual interferences between the DM-RS and the SRS sent by the target UE and the D2D SS. When the source UE and the target UE are located in the no network coverage scenario, the mutual interferences between the DM-RS and the SRS sent by the target UE and the D2D SS can be effectively reduced.

Obviously, those skilled in the art should understand that all components or all steps in the present disclosure may be implemented by using a general calculation apparatus, can be centralized on a single calculation apparatus or can be distributed on a network composed of a plurality of calculation apparatuses. Optionally, they may be implemented by using executable program codes of the calculation apparatuses. Thus, they can be stored in a storage apparatus and executed by the calculation apparatuses, the shown or described steps can be executed in a sequence different from this sequence under certain conditions, or they are manufactured into each integrated circuit component respectively, or a plurality of components or steps therein are manufactured into a single integrated circuit component. Thus, the present disclosure is not limited to a combination of any specific hardware and software.

The above is only the exemplary embodiments of the present disclosure, and is not intended to limit the present disclosure. There can be various modifications and variations in the present disclosure for those skilled in the art. Any modifications, equivalent replacements, improvements and the like within the principle of the present disclosure shall fall within the protection scope defined by the appended claims of the present disclosure.

INDUSTRIAL APPLICABILITY

The technical solutions provided by the embodiments of the present disclosure can be applied to a D2D SS sending process. A source UE selects one ZC sequence from M ZC sequences of which a length is N and maps the sequence to a predefined D2D SS resource, so that the sequence serving as a D2D SS or a part of the D2D SS is sent out, and the problem in the relevant art that a DM-RS or an SRS sent by an interference UE easily brings interference to the D2D SS is solved, thereby achieving the effect of effectively reducing the interference to the D2D SS caused by a PSS, a DM-RS and an SRS sent by a traditional LTE system.

What is claimed is:

1. A method for sending a Device-to-Device Synchronization Signal (D2D SS), comprising:
    selecting, by a source User Equipment (UE), one Zadoff-Chu (ZC) sequence from M predetermined ZC sequences of which a length is N;
    mapping, by the source UE, the selected ZC sequence to a predefined D2D SS resource; and
    sending, by the source UE, a D2D SS obtained after the mapping to a target UE;
    wherein N∈L, M∈[1,Q], and a maximum value Q of M is correlated to the length N of the selected ZC sequence, where
    L={37 41 43 47 53 59 61 62 63 64 67 71 73};
    when N=37, Q=6; when N=41, Q=10; when N=43, Q=12; when N=47, Q=16; when N=53, Q=22; when N=59, Q=28; when N=61, Q=30; when N=62, Q=4; when N=63, Q=7; when N=64, Q=2; when N=67, Q=36; when N=71, Q=40; when N=73, Q=42.

2. The method as claimed in claim 1, wherein selecting, by the source UE, the ZC sequence from the M predetermined ZC sequences of which the length is N comprises:
    determining, by the source UE, a sequence set of a ZC sequence needing to be selected by means of the following formula, and randomly selecting, by the source UE, one sequence from the sequence set as the ZC sequence needing to be selected:

$$d_u(n) = e^{-j\frac{\pi un(n+1)}{N}}, n = 0, 1 \ldots N-1, \text{ or}$$

$$d_u(n) = e^{j\frac{\pi un(n+1)}{N}}, n = 0, 1 \ldots N-1,$$

where a set of root indexes u corresponding to the ZC sequence set is S, and when N is assigned with different values, the set S is:

when $N = 37, S = \{3\ 9\ 15\ 22\ 28\ 34\}$;

when $N = 41, S = \{2\ 6\ 10\ 14\ 18\ 23\ 27\ 31\ 35\ 39\}$;

when $N = 43$, $S = \{2\ 5\ 9\ 13\ 16\ 20\ 23\ 27\ 30\ 34\ 38\ 41\}$;

when $N = 47$, $S = \{1\ 4\ 7\ 10\ 13\ 16\ 19\ 22\ 25\ 28\ 31\ 34\ 37\ 40\ 43\ 46\}$;

when $N = 53$, $S = \begin{Bmatrix} 1 & 4 & 6 & 8 & 11 & 13 & 16 & 18 & 20 & 23 & 25 & 28 & 30 \\ 33 & 35 & 37 & 40 & 42 & 45 & 47 & 49 & 52 & & & & \end{Bmatrix}$;

when $N = 59$, $S = \begin{Bmatrix} 1 & 3 & 5 & 7 & 9 & 12 & 14 & 16 & 18 & 20 & 22 & 24 & 26 & 28 & 31 \\ 33 & 35 & 37 & 39 & 41 & 43 & 45 & 47 & 50 & 52 & 54 & 56 & 58 & & \end{Bmatrix}$;

when $N = 61$,

-continued $$S = \begin{Bmatrix} 1 & 3 & 5 & 7 & 9 & 11 & 13 & 15 & 17 & 19 & 21 & 23 & 25 & 27 & 29 & 32 \\ 34 & 36 & 38 & 40 & 42 & 44 & 46 & 48 & 50 & 52 & 54 & 56 & 58 & 60 & & \end{Bmatrix};$$

when $N = 67$, $$S = \begin{Bmatrix} 1 & 14 & 27 & 40 & 53 & 66 & 3 & 5 & 7 & 8 & 10 & 12 & 16 & 18 \\ 20 & 21 & 23 & 25 & 29 & 31 & 33 & 34 & 36 & 38 & 42 & 44 & 46 & 47 \\ 49 & 51 & 55 & 57 & 59 & 60 & 62 & 64 & & & & & & \end{Bmatrix};$$

when $N = 71$, $$S = \begin{Bmatrix} 1 & 8 & 15 & 24 & 31 & 40 & 47 & 56 & 63 & 70 & 3 & 4 & 6 & 10 & 12 \\ 13 & 17 & 19 & 20 & 22 & & & & & & & & & & \\ 26 & 28 & 29 & 33 & 35 & 36 & 38 & 42 & 43 & 45 & 49 & 51 & 52 & & \\ 54 & 58 & 59 & 61 & 65 & 67 & 68 & & & & & & & & \end{Bmatrix};$$

when $N = 73$, $$S = \begin{Bmatrix} 1 & 6 & 13 & 20 & 27 & 34 & 39 & 46 & 53 & 60 & 67 & 72 \\ 3 & 4 & 8 & 10 & 11 & 15 & 17 & 18 & 22 & 23 & 25 & 29 & 30 & 32 & 36 & 37 \\ 41 & 43 & 44 & 48 & 50 & 51 & 55 & 56 & 58 & 62 & 63 & 65 & 69 & 70 & & \end{Bmatrix};$$

when $N = 63$, $S = \{1\ 11\ 17\ 40\ 46\ 52\ 62\}$;

when $N = 62$, $S = \{17\ 21\ 25\ 61\}$;

when $N = 64$, $S = \{1\ 63\}$.

3. The method as claimed in claim 2, wherein selecting, by the source UE, the ZC sequence needing to be selected from the sequence set comprises:
determining a root index m from a root index set S or a subset of the root index set S in a predetermined manner, and taking a sequence which corresponds to the root index m and is determined from the sequence set as a ZC sequence needing to be selected.

4. The method as claimed in claim 3, wherein when N≠63, the value of the root index m is determined, in the following predetermined manner, as: u corresponding to a maximum value, a maximum sum of any two values or a maximum sum of three values in $$\left|\frac{25}{63} - \frac{u}{N}\right|, \left|\frac{29}{63} - \frac{u}{N}\right|, \left|\frac{34}{63} - \frac{u}{N}\right|,$$

where u∈S, or u∈subset of S, and S is correlated to the value of N, comprising:

when $N = 37$, $S = \{3\ 9\ 15\ 22\ 28\ 34\}$;

when $N = 41$, $S = \{2\ 6\ 10\ 14\ 18\ 23\ 27\ 31\ 35\ 39\}$;

when $N = 43$, $S = \{2\ 5\ 9\ 13\ 16\ 20\ 23\ 27\ 30\ 34\ 38\ 41\}$;

when $N = 47$, $S = \{1\ 4\ 7\ 10\ 13\ 16\ 19\ 22\ 25\ 28\ 31\ 34\ 37\ 40\ 43\ 46\}$;

when $N = 53$, $$S = \begin{Bmatrix} 1 & 4 & 6 & 8 & 11 & 13 & 16 & 18 & 20 & 23 & 25 & 28 & 30 \\ 33 & 35 & 37 & 40 & 42 & 45 & 47 & 49 & 52 & & & & \end{Bmatrix};$$

when $N = 59$, $$S = \begin{Bmatrix} 1 & 3 & 5 & 7 & 9 & 12 & 14 & 16 & 18 & 20 & 22 & 24 & 26 & 28 & 31 \\ 33 & 35 & 37 & 39 & 41 & 43 & 45 & 47 & 50 & 52 & 54 & 56 & 58 & & \end{Bmatrix};$$

when $N = 61$, $$S = \begin{Bmatrix} 1 & 3 & 5 & 7 & 9 & 11 & 13 & 15 & 17 & 19 & 21 & 23 & 25 & 27 & 29 & 32 \\ 34 & 36 & 38 & 40 & 42 & 44 & 46 & 48 & 50 & 52 & 54 & 56 & 58 & 60 & & \end{Bmatrix};$$

when $N = 67$, $$S = \begin{Bmatrix} 1 & 14 & 27 & 40 & 53 & 66 & 3 & 5 & 7 & 8 & 10 & 12 & 16 & 18 \\ 20 & 21 & 23 & 25 & 29 & 31 & 33 & 34 & 36 & 38 & 42 & 44 & 46 & 47 \\ 49 & 51 & 55 & 57 & 59 & 60 & 62 & 64 & & & & & & \end{Bmatrix};$$

when $N = 71$, $$S = \begin{Bmatrix} 1 & 8 & 15 & 24 & 31 & 40 & 47 & 56 & 63 & 70 & 3 & 4 & 6 & 10 & 12 \\ 13 & 17 & 19 & 20 & 22 & & & & & & & & & & \\ 26 & 28 & 29 & 33 & 35 & 36 & 38 & 42 & 43 & 45 & 49 & 51 & 52 & & \\ 54 & 58 & 59 & 61 & 65 & 67 & 68 & & & & & & & & \end{Bmatrix};$$

when $N = 73$, $$S = \begin{Bmatrix} 1 & 6 & 13 & 20 & 27 & 34 & 39 & 46 & 53 & 60 & 67 & 72 \\ 3 & 4 & 8 & 10 & 11 & 15 & 17 & 18 & 22 & 23 & 25 & 29 & 30 & 32 & 36 & 37 \\ 41 & 43 & 44 & 48 & 50 & 51 & 55 & 56 & 58 & 62 & 63 & 65 & 69 & 70 & & \end{Bmatrix};$$

when $N = 63$, $S = \{1\ 11\ 17\ 40\ 46\ 52\ 62\}$;

when $N = 62$, $S = \{17\ 21\ 25\ 61\}$;

when $N = 64$, $S = \{1\ 63\}$.

5. The method as claimed in claim 3, wherein the value of the root index m is determined, in the following predetermined manner, as:

$$m = \begin{cases} N-1, & \text{when } N > 43 \text{ and } N \in L \\ N-2, & \text{when } N = 43 \text{ or } 41 \\ N-3, & \text{when } N = 37 \end{cases}.$$

6. The method as claimed in claim 3, wherein the value of the root index m is determined, in the following predetermined manner, as:

$$m = \begin{cases} 1, & \text{when } N > 43 \text{ and } N \in L \\ 2, & \text{when } N = 43 \text{ or } 41 \\ 3, & \text{when } N = 37 \end{cases}.$$

7. The method as claimed in claim 3, wherein the value of the root index m is determined, in the following predetermined manner, as at least one of:
u corresponding to a maximum value of $$\sum_{v=1}^{30} \left|\frac{v}{31} - \frac{u}{N}\right|,$$

where u∈S, or u∈subset of S; and u corresponding to a minimum value of $$\left|u - \frac{N}{2}\right|,$$

where u∈S, or u∈subset of S.

8. The method as claimed in claim 7, wherein when N≥67, the value of the root index m is determined, in the following predetermined manner, as:
u corresponding to a minimum value of $$\left|u - \frac{N}{2}\right|,$$

where u∈first K elements of S, the value of K being:

$$K = \begin{cases} 6, & N = 61 \\ 10, & N = 71 \\ 12, & N = 73 \end{cases}.$$

9. The method as claimed in claim 2, wherein selecting, by the source UE, the ZC sequence from the M predetermined ZC sequences comprises:
adopting different root indexes on different predetermined D2D SS resources according to a predetermined rule, and determining a ZC sequence needing to be selected according to the root indexes.

10. The method as claimed in claim 9, wherein adopting different root indexes on different predetermined D2D SS resources according to the predetermined rule comprises:
determining, on a first predefined D2D SS resource, the value of the root index m as:
u corresponding to a minimum value of $$\left|u - \frac{N}{2}\right|;$$

determining, on a second predefined D2D SS resource, the value of the root index m as:
u corresponding to a second minimum value of $$\left|u - \frac{N}{2}\right|,$$

where u∈S, or u∈subset of S; or,
determining, on the first predefined D2D SS resource, the value of the root index m as:
u corresponding to a maximum value of $$\sum_{v=1}^{30} \left|\frac{v}{31} - \frac{u}{N}\right|;$$

determining, on the second predefined D2D SS resource, the value of the root index m as:
u corresponding to a second maximum value of $$\sum_{v=1}^{30} \left|\frac{v}{31} - \frac{u}{N}\right|;$$

where u∈S, or
u∈subset of S.

11. The method as claimed in claim 2, wherein selecting, by the source UE, the ZC sequence from the M predetermined ZC sequences comprises:
adopting, by the source UE, a root index indicated by network side signalling, and determining a ZC sequence needing to be selected according to the root index.

12. The method as claimed in claim 2, wherein when there are multiple source UEs, the multiple source UEs adopt identical ZC sequence group indexes or corresponding ZC sequence root indexes to determine the ZC sequence needing to be selected.

13. The method as claimed in claim 1, wherein selecting, by the source UE, the ZC sequence from the M predetermined ZC sequences of which the length is N comprises:
determining, by the source UE, a ZC sequence needing to be selected by means of the following formula:

$$d_u(n) = e^{-j\frac{\pi u n(n+1)}{N}}, n = 0, 1 \ldots N - 1, \text{ or}$$

$$d_u(n) = e^{j\frac{\pi u n(n+1)}{N}}, n = 0, 1 \ldots N - 1,$$

where u is a root index corresponding to a ZC sequence set;
wherein a manner of determining the root index u comprises:
determining, by the source UE, a group index v of a ZC sequence needing to be selected according to a cell identification number K of a cell to which the source UE belongs by means of the following formula, and determining, by the source UE the root index u according to the following table:
v=k mod M or v=(k mod M+offset) Mod M, where offset is a parameter configured by high-layer in advance, 0≤Offset<M;
where, 0≤k<512, when N is assigned with different values, the root index u of the ZC sequence corresponding to the group index v of the ZC sequence is shown in the following table:

| v | N = 37 | N = 41 | N = 43 | N = 47 | N = 53 | N = 59 | N = 61 | N = 67 | N = 71 | N = 73 | N = 63 | N = 62 | N = 64 |
|---|---|---|---|---|---|---|---|---|---|---|---|---|---|
| 0 | 3 | 2 | 2 | 1 | 1 | 1 | 1 | 1 | 1 | 1 | 1 | 17 | 1 |
| 1 | 9 | 6 | 5 | 4 | 4 | 3 | 3 | 14 | 8 | 6 | 11 | 21 | 63. |
| 2 | 15 | 10 | 9 | 7 | 6 | 5 | 5 | 27 | 15 | 13 | 17 | 25 | |
| 3 | 22 | 14 | 13 | 10 | 8 | 7 | 7 | 40 | 24 | 20 | 40 | 61 | |
| 4 | 28 | 18 | 16 | 13 | 11 | 9 | 9 | 53 | 31 | 27 | 46 | | |
| 5 | 34 | 23 | 20 | 16 | 13 | 12 | 11 | 66 | 40 | 34 | 52 | | |

-continued

| v | N=37 | N=41 | N=43 | N=47 | N=53 | N=59 | N=61 | N=67 | N=71 | N=73 | N=63 | N=62 | N=64 |
|---|---|---|---|---|---|---|---|---|---|---|---|---|---|
| 6 |  | 27 | 23 | 19 | 16 | 14 | 13 | 3 | 47 | 39 | 62 |  |  |
| 7 |  | 31 | 27 | 22 | 18 | 16 | 15 | 5 | 56 | 46 |  |  |  |
| 8 |  | 35 | 30 | 25 | 20 | 18 | 17 | 7 | 63 | 53 |  |  |  |
| 9 |  | 39 | 34 | 28 | 23 | 20 | 19 | 8 | 70 | 60 |  |  |  |
| 10 |  |  | 38 | 31 | 25 | 22 | 21 | 10 | 3 | 67 |  |  |  |
| 11 |  |  | 41 | 34 | 28 | 24 | 23 | 12 | 4 | 72 |  |  |  |
| 12 |  |  |  | 37 | 30 | 26 | 25 | 16 | 6 | 3 |  |  |  |
| 13 |  |  |  | 40 | 33 | 28 | 27 | 18 | 10 | 4 |  |  |  |
| 14 |  |  |  | 43 | 35 | 31 | 29 | 20 | 12 | 8 |  |  |  |
| 15 |  |  |  | 46 | 37 | 33 | 32 | 21 | 13 | 10 |  |  |  |
| 16 |  |  |  |  | 40 | 35 | 34 | 23 | 17 | 11 |  |  |  |
| 17 |  |  |  |  | 42 | 37 | 36 | 25 | 19 | 15 |  |  |  |
| 18 |  |  |  |  | 45 | 39 | 38 | 29 | 20 | 17 |  |  |  |
| 19 |  |  |  |  | 47 | 41 | 40 | 31 | 22 | 18 |  |  |  |
| 20 |  |  |  |  | 49 | 43 | 42 | 33 | 26 | 22 |  |  |  |
| 21 |  |  |  |  | 52 | 45 | 44 | 34 | 28 | 23 |  |  |  |
| 22 |  |  |  |  |  | 47 | 46 | 36 | 29 | 25 |  |  |  |
| 23 |  |  |  |  |  | 50 | 48 | 38 | 33 | 29 |  |  |  |
| 24 |  |  |  |  |  | 52 | 50 | 42 | 35 | 30 |  |  |  |
| 25 |  |  |  |  |  | 54 | 52 | 44 | 36 | 32 |  |  |  |
| 26 |  |  |  |  |  | 56 | 54 | 46 | 38 | 36 |  |  |  |
| 27 |  |  |  |  |  | 58 | 56 | 47 | 42 | 37 |  |  |  |
| 28 |  |  |  |  |  |  | 58 | 49 | 43 | 41 |  |  |  |
| 29 |  |  |  |  |  |  | 60 | 51 | 45 | 43 |  |  |  |
| 30 |  |  |  |  |  |  |  | 55 | 49 | 44 |  |  |  |
| 31 |  |  |  |  |  |  |  | 57 | 51 | 48 |  |  |  |
| 32 |  |  |  |  |  |  |  | 59 | 52 | 50 |  |  |  |
| 33 |  |  |  |  |  |  |  | 60 | 54 | 51 |  |  |  |
| 34 |  |  |  |  |  |  |  | 62 | 58 | 55 |  |  |  |
| 35 |  |  |  |  |  |  |  | 64 | 59 | 56 |  |  |  |
| 36 |  |  |  |  |  |  |  |  | 61 | 58 |  |  |  |
| 37 |  |  |  |  |  |  |  |  | 65 | 62 |  |  |  |
| 38 |  |  |  |  |  |  |  |  | 67 | 63 |  |  |  |
| 39 |  |  |  |  |  |  |  |  | 68 | 65 |  |  |  |
| 40 |  |  |  |  |  |  |  |  |  | 69 |  |  |  |
| 41 |  |  |  |  |  |  |  |  |  | 70 |  |  |  |

14. The method as claimed in claim 13, wherein selecting, by the source UE, the ZC sequence from the M predetermined ZC sequences comprises:
adopting different group indexes on different predetermined D2D SS resources according to a predetermined rule, and determining a ZC sequence needing to be selected according to the root indexes.

15. The method as claimed in claim 14, wherein adopting different group indexes on different predetermined D2D SS resources according to the predetermined rule comprises:
determining, on a first predefined D2D SS resource, the value of the group index v as:

$v=(k \bmod M+\text{offset\_1})\bmod M$; and determining, on a second predefined D2D SS resource, the value of the group index v as:

$v=(k \bmod M+\text{offset\_2})\bmod M$, where offset_1 and offset_2 are parameters configured by high-layer in advance, 0≤Offset_1, Offset_2<M, and Offset_1≠Offset_2.

16. The method as claimed in claim 13, wherein selecting, by the source UE, the ZC sequence from the M predetermined ZC sequences comprises:
adopting, by the source UE, a group index indicated by network side signalling, and determining a ZC sequence needing to be selected according to the group index.

17. The method as claimed in claim 13, wherein when there are multiple source UEs, the multiple source UEs adopt identical ZC sequence group indexes or corresponding ZC sequence root indexes to determine the ZC sequence needing to be selected.

18. The method as claimed in claim 1, wherein before the source UE maps the selected ZC sequence to the predefined D2D SS resource, the method further comprises:
performing, by the source UE, cyclic shift expansion or punching on the selected ZC sequence.

19. An apparatus for sending a Device-to-Device Synchronization Signal (D2D SS), located at a User Equipment (UE), the apparatus comprising: a hardware processor, configured to perform programming components stored in a memory, wherein the programming components comprise:
a selection component, configured to select one Zadoff-Chu (ZC) sequence from M predetermined ZC sequences of which a length is N;
a mapping component, configured to map the selected ZC sequence to a predefined D2D SS resource; and
a sending component, configured to send a D2D SS obtained after the mapping to a target UE;
wherein N∈L, M∈[1,Q], and a maximum value Q of M is correlated to the length N of the selected ZC sequence, where
L={37 41 43 47 53 59 61 62 63 64 67 71 73};
when N=37, Q=6; when N=41, Q=10; when N=43, Q=12; when N=47, Q=16; when N=53, Q=22; when N=59, Q=28; when N=61, Q=30; when N=62, Q=4; when N=63, Q=7; when N=64, Q=2; when N=67, Q=36; when N=71, Q=40; when N=73, Q=42.

20. The apparatus as claimed in claim 19, wherein the programming components further comprise:

a storage component, configured to store the selected ZC sequence; and a processing component, configured to perform cyclic shift expansion or punching on the selected ZC sequence.

21. A User Equipment (UE), comprising: an apparatus for sending a Device-to-Device Synchronization Signal (D2D SS) as claimed in claim 19.

* * * * *